United States Patent Office 2,727,923
Patented Dec. 20, 1955

2,727,923

PERFLUORO QUATERNARY AMMONIUM COMPOUNDS

Donald R. Husted, St. Paul, Minn., assignor to Minnesota Mining & Manufacturing Company, St. Paul, Minn., a corporation of Delaware No Drawing. Application July 17, 1953,
Serial No. 368,815

4 Claims. (Cl. 260—567.6)

This invention relates to my discovery of a new and useful class of reactive fluorocarbon compounds. These compounds have utility as cationic surface active agents, as surface treating agents, as starting compounds for making derivative compounds, and for other purposes.

These new compounds are perfluoro quaternary ammonium salts and hydroxides of the 1,1-dihydroperfluoroalkyltrialkyl ammonium type and have a saturated perfluoroalkyl terminal chain containing 3 to 9 fully fluorinated carbon atoms. This perfluoro terminal chain provides a fluorocarbon "tail" that imparts novel and useful properties. These quaternary ammonium compounds can be represented by the generic formula:

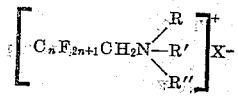

and by the equivalent formula:

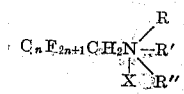

where n (the number of carbon atoms in the terminal fluorocarbon chain) has an integer value of 3 to 9, the "R's" are alkyl groups (which can be the same or different) that each contain 1 to 5 carbon atoms (i. e., are methyl, ethyl, propyl, butyl or amyl groups), and "X" is a halogen atom (iodine, bromine, chlorine or fluorine) or a hydroxyl group (OH).

The halide salts in dry form are solid crystalline ionic substances in which halogen atoms are present as anions (negative ions) that are ionically bonded to the quaternary ammonium cations (positive ions). They are very soluble to sparingly soluble in water (the solubility decreasing with increase in number of carbon atoms) and are insoluble in ether. They ionize in aqueous solutions, providing positively charged fluorocarbon-containing cation groups capable of being strongly adsorbed on surfaces.

The corresponding hydroxides have the same cationic quaternary ammonium group but the halide anion has been replaced by a hydroxyl anion (OH−):

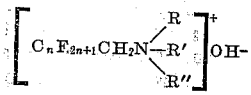

They can be obtained by reacting the corresponding halides with an aqueous suspension of silver oxide to form a solution of the hydroxide, i. e., the free quaternary ammonium base, which can be filtered to remove the silver halide reaction product and any unreacted silver oxide. This solution can be evaporated or distilled to obtain the free base in concentrated or substantially free form, but ordinarily the unconcentrated hydroxide solution would be utilized. These hydroxide compounds provide the same surface-active cations as do the salts but with the advantage for some purposes that solutions will contain hydroxide ions rather than halide ions as the anions.

The terminal fluorocarbon chain is responsible for useful properties that make these quaternary ammonium salts and hydroxides quite different from the corresponding non-fluorinated compounds of conventional organic chemistry. In particular, the water-repellency of surface treatment coatings thereof is greatly enhanced despite the absence of a long hydrocarbon chain, and a unique new characteristic is obtained—that of oil-repellency. Coatings formed by solutions of the present compounds are both hydrophobic and oleophobic, being repellent both to water and to oils, greases and hydrocarbon solvents. These compounds are useful for treating glass, metals, paper and cloth to provide repellency to water, oils and greases. These compounds are also useful as additives for reducing the surface tension of aqueous solutions, even including strongly oxidizing acid solutions in which hydrocarbon type agents are unstable and unable to function for any substantial length of time. Thus, for instance, these compounds have utility as additives for electroplating baths.

The quaternary ammonium hydroxides can be reacted with acids to form acid salts thereof containing the anionic portion of the acid molecule. Reaction with carboxylic acids yields the acyloxy salts. For instance, reaction with trifluoroacetic acid yields the trifluoroacetoxy salts:

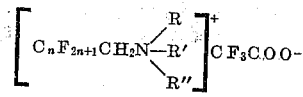

These acids salts also possess substantial surface activity.

The surface-active properties are enhanced, and the solubility in water decreased, with increase in the length of the fluorocarbon chain, as shown by the markedly greater surface activity and lower solubility of the compounds containing nine carbon atoms in the fluorocarbon chain as compared with those containing three carbon atoms in this chain. An illustration of the former type is the n - 1,1 - dihydroperfluorodecyl - diethyl - methyl ammonium iodide compound:

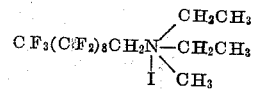

However, marked surface activity is present even in the case of the lower members of the series, as illustrated by the n - 1,1 - dihydroperfluorobutyl - diethyl - methyl ammonium iodide compound:

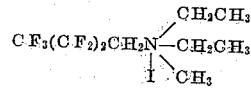

Thus in the case of the compound just mentioned, it has been found that the surface tension of a 1% aqueous solution is 56 dynes/cm. at 25° C. as compared to 72 dynes/cm. for pure water, despite the fact that this compound is very soluble in water. A simple experiment strikingly demonstrates the surface treatment effect. A clean test tube is partly filled with pure water and is shaken so as to wet the entire wall. A solution of the compound is added in amount to produce a total concentration of about 1% and the tube is again shaken. This results in the water drawing away from the glass surface, leaving it dry, and the body of water develops a high-angle meniscus. The glass surface has been "plated" with a tightly adsorbed layer that displaces and repels water. Pouring out the solution leaves a dry surface.

When a solution of one of the present compounds is applied to a surface, the fluorocarbon-containing cations of the compound are adsorbed and this results in an outer fluorocarbon-type surface, formed of the projecting non-polar fluorocarbon "tails." It is this exposed surface that provides the combination of hydrophobic and oleophobic surface properties of the coating.

Corresponding compounds containing only one or two carbon atoms in the fluorocarbon chain do not posses appreciable surface active properties. It is critical that at least three carbon atoms be present in the fluorocarbon chain, that is, that the molecule have a fluorocarbon "tail" consisting of at least three fully fluorinated carbon atoms, and that the hydrocarbon linking group contain only one carbon atom (thus being a methylene group).

It is also of critical importance that the fluorocarbon chain or "tail" be free from hydrogen atoms. In particular, the presence of even one hydrogen atom on the last or next to last carbon atom of the "tail" will markedly alter the surface active and solubility properties, reducing surface activity and the hydrophobic and oleophobic characteristics of surface coatings. Hydrogen is electropositive whereas fluorine is strongly electronegative, hence the presence of hydrogen and fluorine in the terminal portion of the "tail" renders it polar instead of non-polar; and also renders the "tail" less stable to heating owing to the opportunity for dehydrofluorination. The presence of hydrogen in the exposed or terminal region of the "tail" also provides opportunity for chemical attack.

I have found that the present quaternary ammonium halide salts can be prepared from fluorocarbon acid chloride starting compounds by the following series of steps, which will be illustrated in detail in the subsequent experimental example:

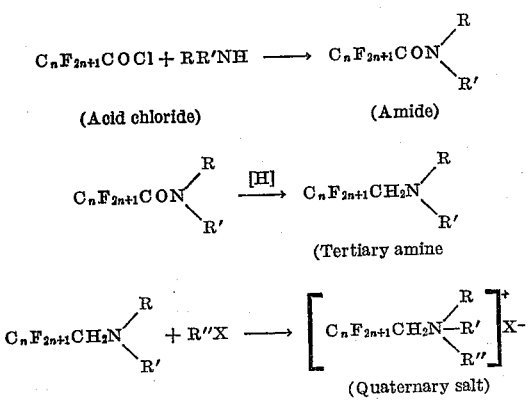

In the above scheme, the first stage involves the conversion of the perfluoroalkyl acid chloride (which provides the fluorocarbon "tail" of the final product) to the corresponding N-substituted fluorocarbon amide by reaction with a dialkyl amine. In the second stage the fluorocarbon amide is reduced (for example by use of lithium aluminum hydride) to the corresponding tertiary fluorocarbon amine. In the third stage the fluorocarbon amine is reacted with an alkyl halide to yield the quaternary ammonium halide product compound. This halide salt can be converted to the corresponding hydroxide product if desired, as previously indicated.

This preparatory procedure will now be illustrated by an experimental example which will also serve as a guide to the making of other compounds. This example specifically illustrates (though the teachings are not limited to) the preparation of halide salts of the subgeneric class of 1,1-dihydroperfluoroalkyl-diethyl-methyl ammonium halides:

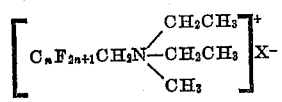

and the corresponding hydroxides.

*Example*

The illustrative procedure of this example relates specifically to the preparation of n-1,1-dihydroperfluorobutyl-diethyl-methyl ammonium iodide:

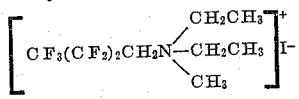

and the corresponding hydroxide. The fluorocarbon starting compound is perfluorobutyryl chloride:

$$CF_3(CF_2)_2COCl$$

Such starting compounds are disclosed and claimed in the patent of Diesslin, Kauck and Simons No. 2,567,011 (September 4, 1951).

*Preparation of the amide.*—The intermediate fluorocarbon amide was prepared as follows: A dry 200 ml. flask fitted with a reflux condenser was charged with 29.4 grams (0.4 mole) of diethylamine and 50 ml. of dry ether (serving as a solvent vehicle). To this was slowly added with agitation a solution of 46 grams (0.2 mole) of perfluorobutyryl chloride in 50 ml. of ether. The extremely vigorous reaction which ensued was essentially complete by the end of the addition. The reaction mixture was poured into 50 ml. of water and the resulting mixture stirred a few minutes until the diethylamine hydrochloride by-product had dissolved, leaving the desired product as an oily lower layer. The oily layer was separated, washed with water, and purified by vacuum distillation. The yield was 40.7 grams (76%) of pure N,N-diethylperfluorobutyramide:

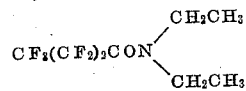

This compound had a vacuum boiling point of 80–82° C. (at 28 mm.), and was found to have a refractive index of 1.3564 at 20° C.

*Preparation of the amine.*—The intermediate tertiary amine was prepared from the above amide as follows: A 2000 ml. 3-necked flask was fitted with a tight-sleeve stirrer, reflux condenser, dropping funnel and a gas inlet tube, the equipment having been previously oven dried at 125° C. and assembled while hot and with dry nitrogen flowing then and at all times thereafter to completely exclude air (oxygen). The flask was charged with 1000 ml. of dry ether and then with 14 grams (0.37 mole) of lithium aluminum hydride in finely powdered form, with constant stirring which resulted in the powder being fully dissolved in two hours. During this time and thereafter a nitrogen flow of 0.5 to 1.0 cubic foot per hour was maintained. The flask was then set in an ice bath and a solution of 31.5 grams (0.1165 mole) of the previously obtained N,N-diethylperfluorobutyramide, dissolved in 250 ml. of dry ether, was added dropwise at such a rate as to maintain a gentle reflux of ether. The mixture was allowed to warm to room temperature and then was stirred over night. The flask was then set in a Dry Ice bath (mixture of solid-CO$_2$ and acetone) and the excess lithium aluminum hydride was destroyed by the addition of water. To avoid explosion, care was taken to ensure that the water (added through the dropping funnel) did not directly reach the side of the flask, where unreacted lithium aluminum hydride may have been deposited. The inlet tube of the dropping funnel was bent so as to properly direct the water. Care was taken to maintain a proper flow of nitrogen. As a further safety precaution, the addition of water was remotely controlled from behind explosion shields. To the flask was then added a mixture of 50 ml. of concentrated sulfuric acid and 50 grams of ice. Two layers were formed, an upper ether layer and a lower aqueous layer. The ether layer was removed and the lower aqueous layer was extracted three times with ether. The ether layer and ether extracts were combined and fractionated to yield 8.8 grams of the desired N,N-diethyl-(1,1-dihydroperfluorobutyl) amine:

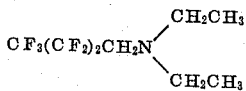

This compound had a boiling point of 119–120° C. (at 740 mm.), a density of 1.212 at 20° C., and a refractive index of 1.3370 at 22° C. Analysis for nitrogen showed 5.9% (versus 5.6% calculated from the formula, which is a satisfactory agreement within the limits of the possible analytical error).

*Preparation of the quaternary ammonium salt.*—A 25 ml. Erlenmeyer flask was charged with 10.7 grams (0.0416 mole) of N,N-diethyl-(1,1-dihydroperfluorobutyl) amine, 6.5 grams (0.0462 mole) of methyl iodide, and 2 grams of dry ether to act as a mutual solvent and cause the reactants to form a homogeneous solution. The flask was stoppered tightly and allowed to stand at room temperature for 18 days at which time approximately one-half of the liquid was filled with yellow crystals. The mixture was centrifuged to separate the crystals and these were washed three times with dry ether. More crystals were obtained upon further standing of the mother liquid. A sample was analyzed and found to contain 31.2% fluorine (calc. 33.5%) and 31.5% iodine (calc. 31.75%).

These yellow crystals were the desired product in substantially pure form, that is, the quaternary ammonium iodide compound, normal 1,1-dihydroperfluorobutyl-diethyl-methyl ammonium iodide. The crystals are anisotropic and birefringent. They have a melting point of 142–143° C. This solid compound is very soluble in water, in both absolute ethyl alcohol and 95% alcohol, and in acetone, and is moderately soluble in hydrocarbon solvents and oils, but it is insoluble in ether. It has marked surface active properties as previously pointed out, despite the fact that it is highly soluble in water.

X-rays are strongly absorbed by this material, so it is difficult to obtain a visible diffraction pattern. The three most prominent Debye-Scherrer fine-powder X-ray lines were found to be:

I—4.60—V. V. S.
II—5.24—V. S.
III—4.39—S.

The marked opacity to X-rays indicates utility for uses in which this property is desired.

While the use of methyl iodide is convenient in forming quaternary ammonium salts, as illustrated above, especially because it is a liquid whereas the other methyl halides (methyl bromide, methyl chloride and methyl fluoride) are gases at room temperature, the methyl bromide and chloride would generally be preferable in commercial usage because of lower cost, and can be reacted with the amine in a pressure vessel. Higher alkyl halides can also be employed (ethyl, propyl, butyl and amyl halides).

*Preparation of the quaternary ammonium hydroxide.*—The above-described quaternary ammonium iodide salt was converted to the hydroxide by shaking an aqueous solution of the iodide with an excess of silver oxide for two days. The unreacted silver oxide and the silver iodide reaction product were removed by filtration. The aqueous filtrate contained the hydroxide reaction product in dissolved ionized form, this product compound being identified as 1,1-dihydroperfluorobutyl-diethyl-methyl ammonium hydroxide:

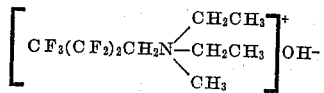

The marked surface activity of this basic compound closely resembles that of the salt. For instance, a 5% aqueous solution has a surface tension of 53 dynes/cm.

A portion of the filtrate solution was concentrated in vacuo and finally distilled at high vacuum in a molecular still at about 50° C. The oily product had an amine-like odor. The infrared absorption spectral curve showed a strong hydroxyl (—OH) absorption. There may have been some decomposition, but it is believed that this product consisted essentially of the free base having the above-mentioned formula.

This hydroxide and its solutions can be reacted with acids to provide acid salts, for example with trifluoroacetic acid to provide the corresponding trifluoroacetate salt:

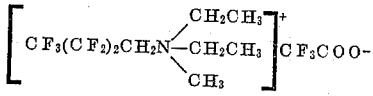

I claim:

1. As new and useful quaternary ammonium compounds, the compounds of the class consisting of the 1,1-dihydroperquoroalkyl-trialkyl ammonium salts and hydroxides represented by the formula:

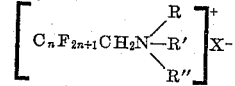

where $n$ has an integer value of 3 to 9, the "R's" are alkyl groups that each contain 1 to 5 carbon atoms, and "X" is a member of the class consisting of halogen atoms and the hydroxyl group.

2. The compounds of the class consisting of the 1,1-dihydroperfluoroalkyl-diethyl-methyl ammonium salts and hydroxides represented by the formula:

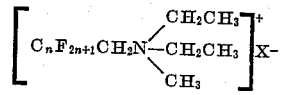

where $n$ has an integer value of 3 to 9 and "X" is a member of the class consisting of halogen atoms and the hydroxyl group.

3. The normal 1,1-dihydroperfluorobutyl-diethyl-methyl ammonium iodide compound, having the formula:

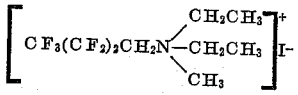

4. The normal 1,1-dihydroperfluorobutyl-diethyl-methyl ammonium hydroxide compound, having the formula:

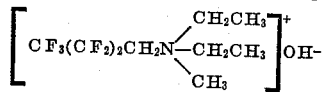

No references cited.